3,383,349
COATING COMPOSITIONS
Michael H. Grasley, Walnut Creek, Calif., assignor to Shell Oil Company, New York, N.Y., a corporation of Delaware
No Drawing. Filed Dec. 22, 1964, Ser. No. 420,457
2 Claims. (Cl. 260—28.5)

ABSTRACT OF THE DISCLOSURE

Petroleum waxes, particularly residual or microcrystalline waxes, are improved particularly with respect to elongation and tensile strength, by the incorporation of a minor proportion, e.g. 5–60% by weight, of an essentially unblocked copolymer of ethylene and cyclopentene and/or 1,5-hexadiene containing from 80–96 mol percent ethylene monomeric units and, resulting from the cyclopentene or 1,5-hexadiene comonomer, chain-integrated rings in which chain carbon atoms form part of the ring, the copolymer having an intrinsic viscosity of 2–7 and an average molecular weight of at least 100,000.

---

This invention relates to coating compositions and particularly to wax-extended polymeric coatings.

Petroleum-derived waxes have been used for many years to coat paper and carton boards especially for use in wrapping and containing dairy products and other food products such as bakery goods as well as for coating cloth, fibers, and food products including cheese and meats to render them moisture-vapor resistant. Such waxes, however, have had an unfortunate tendency to crack and peel off the coated articles, especially when they are subjected to repeated flexing or severe creasing. Even waxes modified with polyethylene, while having some improved properties, show disadvantages relative to brittleness and lack of tensile strength particularly under low-temperature conditions.

In the last few years, the disadvantages which are normally attendant to the use of wax in coating applications have resulted in the significant supplanting of wax alone by the use of polymeric coatings, polyethylene and polypropylene in particular. However, despite the wide use of polymer-coated paper for a wide variety of packaging uses, such laminates have not been a panacea since they too lack the desired resistance to penetration by oxygen, grease, organic vapors and water vapors. In addition, polyethylene coatings have not been found to possess the desired amount of resistance to abrasion and flexing. Polypropylene coatings, while superior to polyethylene in some respects, are deficient in that they lack the rigidity of wax in practical thicknesses. As a result there has been considerable interest in the incorporation of polymeric materials into wax for the purpose of benefitting from the most desirable properties of both. Thus, polymers such as ethylene-propylene copolymer, ethylene-vinyl acetate copolymer, ethylene-vinyl acrylate, copolymer, various synthetic rubbers and the like have all been proposed for incorporation into wax.

Each of the above-mentioned copolymers which has been suggested for incorporation into wax can be characterized as consisting of a long polyethylenic chain backbone containing randomly distributed side chains or substituents. These substituents have invariably been of linear nature such as alkyl, carboxyl, carboxylic acid esters and the like. While the mechanism by which such copolymers interact with wax is not known, it has been theorized that the interaction is based on the presence of occasional side chains since similar interactions, especially of wax reinforcement, are not obtained in the same manner or degree with unbranched or regularly branched polymers such as polyethylene, polypropylene, polybutadiene, polyvinyl chloride and polyvinyl acetate.

However, it has now been discovered that wax-copolymer compositions, having substantial polymer-like properties, can be prepared using copolymers which have no continuous polyethylenic back bone but which have cyclic group interruptions along the polymer chain. In particular, the invention relates to wax compositions containing reinforcing amounts of ring-branched copolymers in which chain carbon atoms form part of the ring. Still more particularly, the invention lies in the discovery of wax compositions containing reinforcing amounts of a copolymer corresponding to the general linear configuration

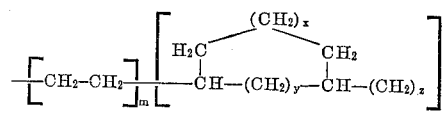

in which $x$, $y$ and $z$ are integers of from 0 to 1, the sum of $x$ and $z$ being equal to 1 and $m$ is an average integer ranging from about 4 to 24, the copolymer having an intrinsic viscosity, measured in decalin at 150° C., of from 2 to 7.

Copolymers of the above configuration can be synthesized by reaction of ethylene and either cyclopentene or 1,5-hexadiene, or mixtures of the two, in the presence of the preformed Ziegler-type catalyst $Al(C_2H_5)_3/TiCl_3$. A catalyst of this type is described detailedly in U.S. Patent 3,141,872, issued July 21, 1964. Still another Ziegler-type catalyst is $Al(C_6H_{13})_3/VCl_4$. The copolymerization is carried out in the presence of an inert hydrocarbon solvent such as heptane under moderate heating conditions such as 30–60° C. Reaction times of from 20 to 180 minutes are typical for copolymerization reactions of this nature.

The copolymers of this type which are useful in the compositions of the invention have an average molecular weight of at least 100,000 and have intrinsic viscosities of from about 2 to 7. Copolymers below I.V. 2 have drastically reduced wax-reinforcing properties, while those above I.V. 7 have insufficient liquid phase compatibility with wax to be practicable wax additives.

It is also preferred that the copolymers of the invention contain at least 80 but not more than about 96 mole percent ethylenic monomeric units. As in the case of intrinsic viscosities below 2, it is important that the mole percent of ethylene in the copolymers of the invention not be below about 80% since, below that amount, the copolymers have greatly reduced capability of reinforcing wax to give polymer-like properties.

It is likewise important to this application of the copolymers that they be of an essentially unblocked character. That is, the distribution of the chain-integrated rings along the entire polymer chain should be of a random nature in which the rings are present in single units and not blocks of two or more. To this end, it is important during the preparation of these polymers that the dispersion of the comonomers in the polymerization solution be quite thorough. When polymers of a blocked character are formed, the reinforcing properties of the polymer are so reduced as to make the copolymer substantially ineffective for the compositions of the invention.

The waxes which may be used in accordance with the invention, and which are preferred, are petroleum waxes derived from the refining of waxy lubricating oil base stocks. By the term "distillate wax" is meant those waxes which are derived from the refining of distillate lubricating oils, while the term "residual wax" refers to those waxes which are removed during refining of residual lubricating oils such as bright stock. The distillate waxes are generally paraffinic in nature, the ratio of normal-to-isoparaffins in which is inversely related to their molecular weight. The residual waxes, on the other hand, may contain microcrystalline wax or high-melting-point paraffins or both. Virtually all residual waxes are constituted of a mixture of both microcrystalline (amorphous) and paraffinic waxes; however such waxes can be further refined (split) to produce separate wax fractions which are essentially microcrystalline and essentially paraffinic (crystalline) in character. To be used in the coating compositions of the invention, the waxes must be rather highly refined, i.e., they should contain no more than about 2.0% by weight oil and preferably 1.0% by weight or less.

Properties of typical petroleum waxes which can be used in the composition of the invention either by themselves or various mixtures are given in the following table:

TABLE I.—NEAT PETROLEUM WAX PROPERTIES

| Type of Wax | Melting Point, °F. | Carbon Number | Percent n-Paraffins | Tensile Strength at 77° F. |
|---|---|---|---|---|
| A. Isoparaffinic distillate wax | 110–112 | 21–36 | 28 |  |
| B. Paraffinic distillate wax | 125–127 | 20–30 | 94 | 268 |
| C. Paraffinic distillate wax | 138–140 | 22–36 | 80 | 350 |
| D. Paraffinic/isoparaffinic heavy distillate wax | 158–162 | 24–45 | 52 | 186 |
| E. Bright stock (residual) wax | 176 | 28–60 | 25 |  |
| F. Amorphous (microcrystalline) wax | 137–142 | 28–60 | 12 |  |
| G. High-melting-point residual paraffinic wax | 180–182 | 30–60 | 45 | 245 |

The compositions of the invention therefore consist of wax, preferably petroleum wax, and sufficient amounts of the above-discussed copolymer to reinforce the wax and give the composition polymer-like properties. More particularly, the compositions of the invention consist of 95–40% by weight wax and 5–60% by weight of the copolymer as defined hereinabove. At least about 5% by weight copolymer is required to give any substantial degree of wax reinforcement. On the other hand, above about 60% by weight copolymer, the economic advantage of small amounts of wax is lost and the beneficial properties of the wax, e.g. water-vapor impermeability, are so diluted as to be negligible.

The invention will be more readily understood by reference to the following examples:

EXAMPLE I

A series of ethylene-1,5-hexadiene copolymers was prepared by addition of ethylene to a solution of 1,5-hexadiene in heptane containing also a small amount of $VCl_4/Al(n-C_6H_{13})_3$ catalyst. The ethylene addition was carried out over a period of 20 to 40 minutes at 55–60° C. The properties of the eleven copolymers thusly prepared are given in the table below. For comparison, the properties of a linear polyethylene are also given.

TABLE II.—PROPERTIES OF NEAT ETHYLENE-1,5-HEXADIENE COPOLYMERS

| Copolymer No. | Mole percent Ethylene | Intrinsic Viscosity (dl./gram) | Melting Point (° C.) | Yield Point (p.s.i.) | Tensile Strength (p.s.i.) | Elongation at Break (percent) |
|---|---|---|---|---|---|---|
| 1 | 71 | 3.2 |  | 650 | 4,470 | 460 |
| 2 | 74 | 2.9 | 129 | 560 | 4,200 |  |
| 3 | 82 | 3.6 | 134 | 840 | 4,000 | 500 |
| 4 | 84 | 4.3 | 128 | 940 | 4,590 | 510 |
| 5 | 86 | 3.3 |  | 1,050 | 1,230 | 420 |
| 6 | 90 | 4.4 |  | 1,180 | 3,480 | 590 |
| 7 | 90 | 6.5 | 135.5 | 1,380 | 3,340 | 480 |
| 8 | 91 | 5.6 | 135 | 1,200 | 3,280 | 510 |
| 9 | 92 | 4.6 | 133.5 | 1,200 | 4,810 | 650 |
| 10 | 94 | 6.5 | 137.5 | 1,410 | 5,460 | 480 |
| 11 | 96 | 6.9 | 134 | 1,550 | 4,790 | 560 |
| Linear polyethylene | 100 | 3.4 |  | 2,765 | 4,930 | 195 |

EXAMPLE II

Each of the above-listed copolymers, as well as the polyethylene, was then admixed with 70% by weight of high-melting-point residual wax in the molten state, cooled, and the strong properties of the wax-polymer composition were determined. The properties of the residual paraffinic wax were the same as those given in the last line of Table I. The properties of the 70/30 wax/polymer compositions were as follows:

TABLE III.—PROPERTIES OF 70/30 WAX/ETHYLENE-1,5-HEXADIENE COPOLYMER COMPOSITIONS

| Copolymer |  |  | Wax Copolymer Composition |  |  |
|---|---|---|---|---|---|
| No. | Mole percent Ethylene | Intrinsic Viscosity (dl./gram) | Yield Point (p.s.i.) | Tensile Strength (p.s.i.) | Elongation at Break (percent) |
| Neat Wax |  |  |  | 245 | 0 |
| 1 | 71 | 3.2 | 980 | 730 | 320 |
| 2 | 74 | 2.9 | 1,050 | 740 | 82 |
| 3 | 82 | 3.6 | 1,160 | 1,150 | 770 |
| 4 | 84 | 4.3 | 1,140 | 920 | 700 |
| 5 | 86 | 3.3 | 1,250 | 1,250 | 0 |
| 6 | 90 | 4.4 | 1,310 | 1,310 | 0 |
| 7 | 90 | 6.5 | 800 | 760 | 20 |
| 8 | 91 | 5.6 | 1,280 | 930 | 400 |
| 9 | 92 | 4.6 | 1,300 | 1,160 | 1,190 |
| 10 | 94 | 6.5 | 1,370 | 1,370 | 0 |
| 11 | 96 | 6.9 | 1,400 | 1,100 | 730 |
| Linear polyethylene | 100 | 3.4 | 1,800 | 1,800 | 32 |

The foregoing data show that linear polyethylene was essentially completely ineffective in increasing the elongation at break of the wax. On the other hand, most of the copolymers (1, 3, 4, 8, 9 and 11) gave quite substantial reinforcement to the wax (i.e., they were wax-extendible) including substantial elongations of 300% or above. However, it is also observed that the remainder of the copolymers (2, 5, 6, 7 and 10), while giving substantial yield and tensile strength, nevertheless failed to give any substantial degree of elongation to the wax-polymer.

In the case of copolymers 5, 6, 7 and 10 this is due to inadvertent blocking of the copolymer which occurred, at least in part, as a result of improper dispersion of the ethylene in the 1,5-hexadiene during polymerization.

From the properties of the compositions containing copolymers 1 and 2, it is also apparent that greatly reduced reinforcement is obtained when the mole percent of ethylene falls below about 80 mole percent. Above about 96% ethylene, however, the copolymer becomes too polyethylenic in character, because of the longer average distance between chain interruptions, and thus fails to give elongation properties to the wax-copolymer mixture. Thus, the foregoing data illustrate the importance of random single-chain interruptions (as opposed to blocking) as well as the mole percent of ethylene in the copolymer.

EXAMPLE III

A series of nine ethylene-cyclopentene copolymers was then prepared by addition of ethylene to a solution of cyclopentene also containing a small amount of $$VCl_4/Al(n-C_6H_{13})_3$$

catalyst. The ethylene addition was carried out over a period of 30 to 90 minutes at 30° C. The properties of the nine polymers thusly prepared are given in the table below. Again, the properties of linear polyethylene are given for purpose of comparison.

level, the elongation of the wax-copolymer composition is reduced sharply until the elongation approaches that of wax-polyethylene mixtures.

Though the illustrations herein have been confined to wax-copolymer compositions in which only one of the copolymers of the invention was used to reinforce the wax, mixtures of the copolymers of the invention with other reinforcing copolymers such as ethylene-higher alpha-olefin copolymers can be used as well as substantially non-reinforcing copolymers such as those having molecular weights of 50,000 and below, e.g., polyethylene, ethylene-vinyl acetate copolymer, ethylene-ethyl acrylate copolymer, and the like. In addition minor amounts of other additives may be included such as fillers, oxidation inhibitors and gloss stabilizers. Furthermore, the wax component will more often than not be a mixture of petroleum waxes, paraffinic and/or microcrystalline. As an example, a 30–10–30 by weight mixture of waxes C, D and E respectively (see Table I) is an especially desirable blend of waxes to obtain gloss stability in admixture with reinforcing copolymers.

I claim as my invention:

1. A coating composition consisting essentially of 95–40% by weight petroleum wax and 5–60% by weight of an essentially unblocked copolymer of ethylene and cyclopentene containing from 80 to 96 mole percent of ethylene monomeric units in polyethylene blocks of about

TABLE IV.—PROPERTIES OF NEAT ETHYLENE-CYCLOPENTENE COPOLYMERS

| Copolymer No. | Mole percent Ethylene | Intrinsic Viscosity (dl./gram) | Melting Point (° C.) | Yield Point, (p.s.i.) | Tensile Strength (p.s.i.) | Elongation at Break (percent) |
|---|---|---|---|---|---|---|
| 12 | 90 | 3.4 | | 200 | 1,240 | 525 |
| 13 | 90 | 3.5 | | | 1,320 | 400 |
| 14 | 90 | 5.5 | 120–125 | 665 | 2,970 | 454 |
| 15 | 92 | 6.3 | 120–125 | 713 | 4,230 | 563 |
| 16 | 92 | 6.3 | 120–125 | 841 | 3,580 | 508 |
| 17 | 94 | 6.5 | 120–125 | 818 | 4,450 | 542 |
| 18 | 95 | 6.7 | 120–125 | 705 | 3,800 | 500 |
| 19 | 96.5 | 6.9 | 120–125 | 943 | 4,210 | 513 |
| 20 | 97 | 6.3 | 120–125 | | | |
| Linear polyethylene | 100 | 3.4 | | 2,765 | 4,930 | 195 |

EXAMPLE IV

Each of the above-listed ethylene-cyclopentene copolymers, as well as the polyethylene, was admixed with 70% by weight of high-melting-point residual wax in the manner described in Example II. Properties of the solid wax-copolymer compositions are given in the following table:

4 to about 24 ethylene units separating in single units chain-integrated rings from cyclopentene monomeric units and having an intrinsic viscosity, measured in Decalin at 150° C., of from 2 to 7, and having an average molecular weight of at least 100,000.

2. A composition in accordance with claim 1 which contains about 70% by weight petroleum wax.

TABLE V.—PROPERTIES OF 70/30 WAX/ETHYLENE-CYCLOPENTENE COPOLYMER COMPOSITIONS

| Copolymer | | | Wax/Copolymer Composition | | |
|---|---|---|---|---|---|
| No. | Mole percent Ethylene | Intrinsic Viscosity (dl./gram) | Yield Point (p.s.i.) | Tensile Strength (p.s.i.) | Elongation at Break (percent) |
| Neat wax | | | | 245 | 0 |
| 12 | 90 | 3.4 | 900 | 900 | 800 |
| 13 | 90 | 3.5 | 835 | 1,100 | 900 |
| 14 | 90 | 5.5 | 947 | 1,130 | 639 |
| 15 | 92 | 6.3 | 1,050 | 1,330 | 720 |
| 16 | 92 | 6.3 | 1,160 | 1,310 | 698 |
| 17 | 94 | 6.5 | 1,050 | 1,380 | 680 |
| 18 | 95 | 6.7 | 1,220 | 1,280 | 950 |
| 19 | 96.5 | 6.9 | 1,270 | 991 | 568 |
| 20 | 97 | 6.3 | 1,360 | 960 | 200 |
| Linear polyethylene | 100 | 3.4 | 1,800 | 1,800 | 32 |

The data in Table V show that substantial reinforcement of the wax was obtained with each of the copolymers and that the resulting wax-copolymer compositions had extensive polymer-like properties at least up to an ethylene content of about 96 mole percent. Above this No references cited.

MORRIS LIEBMAN, *Primary Examiner.*

B. A. AMERNICK, *Assistant Examiner.*